United States Patent
Jamp et al.

(10) Patent No.: US 7,209,999 B2
(45) Date of Patent: Apr. 24, 2007

(54) EXPANSION DEVICE FOR STORAGE UNITS

(75) Inventors: Rueiming Jamp, Cupertino, CA (US);
Chao-Hsien Hsu, Cupertino, CA (US);
Chun-Liang Lee, Taipei (TW);
Chih-Hung Kuo, Taipei (TW);
Wen-Tsing Chen, Cupertino, CA (US);
Dean-Chung Wang, Cupertino, CA (US)

(73) Assignee: Inventec Corporation (TW)

( * ) Notice: Subject to any disclaimer, the term of this patent is extended or adjusted under 35 U.S.C. 154(b) by 189 days.

(21) Appl. No.: 10/884,157

(22) Filed: Jul. 2, 2004

(65) Prior Publication Data
US 2005/0177678 A1    Aug. 11, 2005

(30) Foreign Application Priority Data
Feb. 6, 2004    (TW) ................ 93201669 U

(51) Int. Cl.
*G06F 13/00* (2006.01)
(52) U.S. Cl. .................... 710/315; 710/306
(58) Field of Classification Search ............. 710/306, 710/315
See application file for complete search history.

(56) References Cited

U.S. PATENT DOCUMENTS

| | | | |
|---|---|---|---|
| 6,883,081 B2* | 4/2005 | Lanzatella et al. | 711/202 |
| 2003/0191908 A1* | 10/2003 | Cohn et al. | 711/153 |
| 2004/0083323 A1* | 4/2004 | Rabinovitz et al. | 710/315 |
| 2004/0083325 A1* | 4/2004 | Rabinovitz et al. | 710/315 |
| 2005/0010709 A1* | 1/2005 | Davies et al. | 710/305 |
| 2005/0027900 A1* | 2/2005 | Pettey | 710/22 |
| 2006/0018342 A1* | 1/2006 | Pettey et al. | 370/465 |

* cited by examiner

*Primary Examiner*—Glenn A. Auve
(74) *Attorney, Agent, or Firm*—Peter F. Corless; Steven M. Jensen; Edwards Angell Palmer & Dodge LLP

(57) ABSTRACT

An expansion device for storage units is applicable to a data processing system such as a blade server, to allow the number of storage units connected with the expansion device to be adjusted or increased according to user requirements. The expansion device is provided with a first interface connected with the data processing system, and with at least one second interface connected with at least one storage unit. The expansion device further includes a transmitting unit and a switching module for allowing the expansion device to be connected with storage units using different transmitting standards.

3 Claims, 2 Drawing Sheets

EXPANSION DEVICE FOR STORAGE UNITS

FIELD OF THE INVENTION

The present invention relates to expansion devices for storage units, and more particularly, to an expansion device for storage units for use in a data processing system.

BACKGROUND OF THE INVENTION

With the rapid increasing need for enterprises to accommodate information communication between the enterprises, between the enterprises and customers, or between enterprises and other information providers, the enterprises usually have to invest much capital on hardware and software for information management. Hardware integrated with network infrastructure may include web servers, mail servers, application servers, file servers, storage servers, and the like; software may include operation systems for the aforementioned servers, public programs, service program, web browsers, and other application programs required by users.

Blade server, which is an advanced server among the aforementioned servers, takes up small space and exhibits flexibility in controlling the resource capacity. It provides users with a simple way to expand or upgrade by plugging the blade server in a slot of a chassis.

The blade server is a small-scale server, which is generally secured in a tailor-made rack and can be stacked in a row or a column such as dishes or books. The power system and the network connecting device are for shared use in the blade server. Since the blade server consumes less power and occupies less space than a conventional individual server, it helps the enterprises reduce the operation cost. The blade server usually serves as a web server. In case new functions are provided, the blade server can be more widely used; for example, the blade server can be electrically connected with a cluster expansion card that is plugged in another slot of the chassis to enable cluster calculation, or with a network connecting card to enable local area network (LAN) connection.

Although the conventional blade server can significantly reduce its occupied space, the expansion cost thereof is increased. The chassis comprises a plurality of slots for accommodating blade servers. In order to store data, the blade server needs to be electrically coupled to at least one storage unit such as hard disk. The storage unit can be plugged into a specific slot formed on the chassis, or can be integrally formed on a substrate of the blade server.

However, the above plug-in connecting method between the storage unit and the blade server has a drawback that, the provision of the specific slot for storage unit decreases the number of slots for blade servers on the chassis. Moreover, the formation of both the slots for blade servers and the specific slot for storage unit on the chassis makes the fabrication more complicated and also increases the fabrication cost. This also presets the number of the slot for storage unit by the manufacturer, preventing adjustment according to different user requirements. Regarding the integral formation of the storage unit on the substrate of the blade server, a small-scale storage unit is typically used to comply with the size of the blade server, which however costs more than a large-scale storage units. In addition, the expandability by the above connecting methods is not good, and the methods are somewhat complex to implement.

Therefore, the problem to be solved here is to provide an expansion device for storage units, which allows good expandability and good compatibility between storage units using different standards.

SUMMARY OF THE INVENTION

A primary objective of the present invention is to provide an expansion device for storage units, which is applicable to a data processing system, and allows the number of storage units to be adjusted or expanded according to different user requirements.

Another objective of the present invention is to provide an expansion device for storage units, which is applicable to a data processing system, and can be connected with storage units using different standards via a standard switching mechanism.

In accordance with the above and other objectives, the present invention proposes an expansion device for storage units, which is suitably used with a data processing system such as a blade server, to allow the number of storage units connected with the data processing system to be adjusted or expanded according to different user requirements. The expansion device comprises: a first interface connected with a data transmitting interface disposed in the blade server, wherein the first interface is provided with a transmitting standard compatible with that of the data transmitting interface of the blade server; at least one second interface connected with a data transmitting interface disposed in at least one storage unit, wherein the second interface is provided with a transmitting standard compatible with that of the data transmitting interface of the storage unit; and a transmitting unit for providing data communication between the blade server connected to the first interface and the storage unit connected to the second interface. The transmitting unit is preset with a circuit infrastructure corresponding to at least one transmitting standard of storage units. If the transmitting unit corresponds to two or more transmitting standards, a single public circuit infrastructure is employed in compatible parts of the transmitting standards, and specific corresponding circuit infrastructures are employed in incompatible parts of the transmitting standards respectively. A user is allowed to select a circuit infrastructure in the transmitting unit corresponding to a specific transmitting standard of storage units via the switching module, and replace the second interface with another second interface provided with the specific transmitting standard, such that the expansion device can be connected with one or more of the storage units provided with the specific transmitting standard.

Compared with the conventional storage expansion methods, the expansion device for storage units in accordance with the present invention allows the number of storage units connected with the expansion device to be adjusted or increased according to user requirements. Further, the expansion device can be connected with storage units using different transmitting standards via the transmitting unit and the switching module formed in the expansion device.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENT

Figure 1:
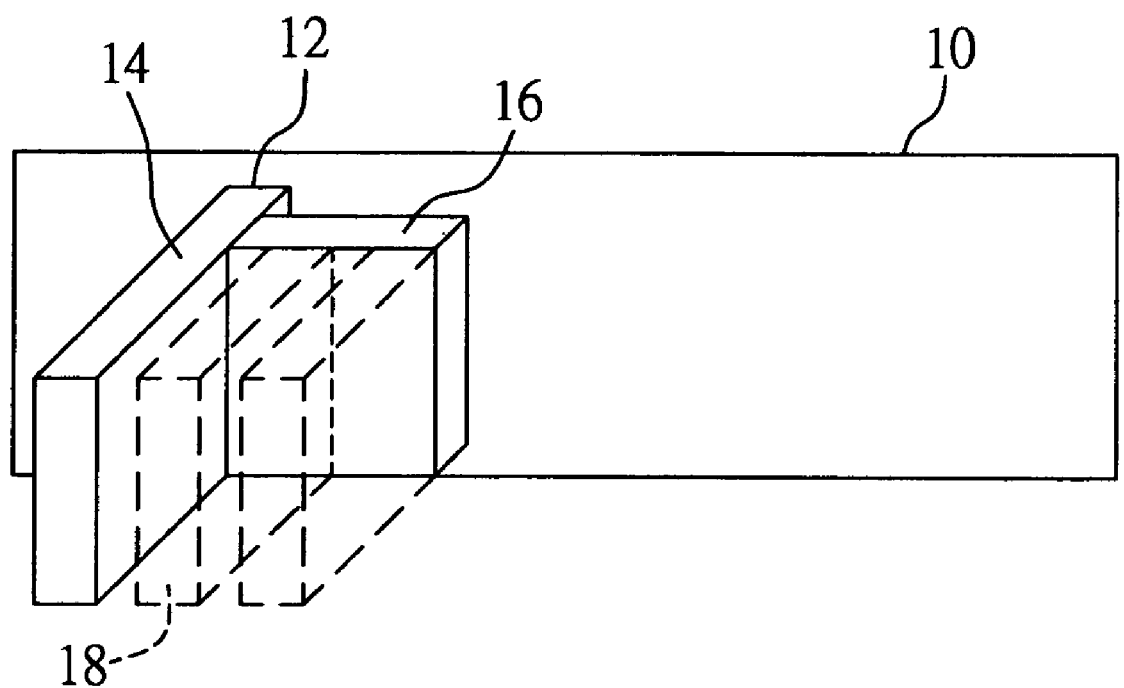
FIG. 1 is a schematic diagram showing an expansion device for storage units in accordance with a preferred embodiment of the present invention.

FIG. 1 shows an expansion device for storage units proposed in the present invention applied to a server system. As shown, the expansion device 16 is used in the server system comprising a chassis 10, at least one slot 12, at least one blade server 14, and can be connected with one or more storage units 18.

The chassis 10 is disposed in a casing (not shown) of the server system. The chassis 10 can be formed with a plurality of accommodating spaces, fastening mechanisms and/or connecting mechanisms according to user requirements, for accommodating, fastening and/or connecting data read/write devices such as motherboard, memory chip, storage device and/or CD (compact disc) burner, etc.

A plurality of the slots 12 (only one is shown) can be formed on the chassis 10 for plugging in hardware devices using transmitting standards corresponding to the slots 12. In this embodiment, the slot 12 is for the blade server 14 to be inserted therein.

The blade server 14 is shaped as a blade, which connects data processors, motherboard, memory chips, hard disk and network equipment such as network cards to an interface (not shown). The blade server 14 can be plugged in and electrically connected to the corresponding slot 12 of the chassis 10 via golden fingers of the interface or other connecting units compatible with the slot 12, so as to allow the blade server 14 to communicate data with other devices such as the aforementioned data read/write devices mounted on the chassis 10. In this embodiment, the blade server 14 comprises at least one data transmitting interface 14a to be connected with the expansion device 16.

Figure 2:
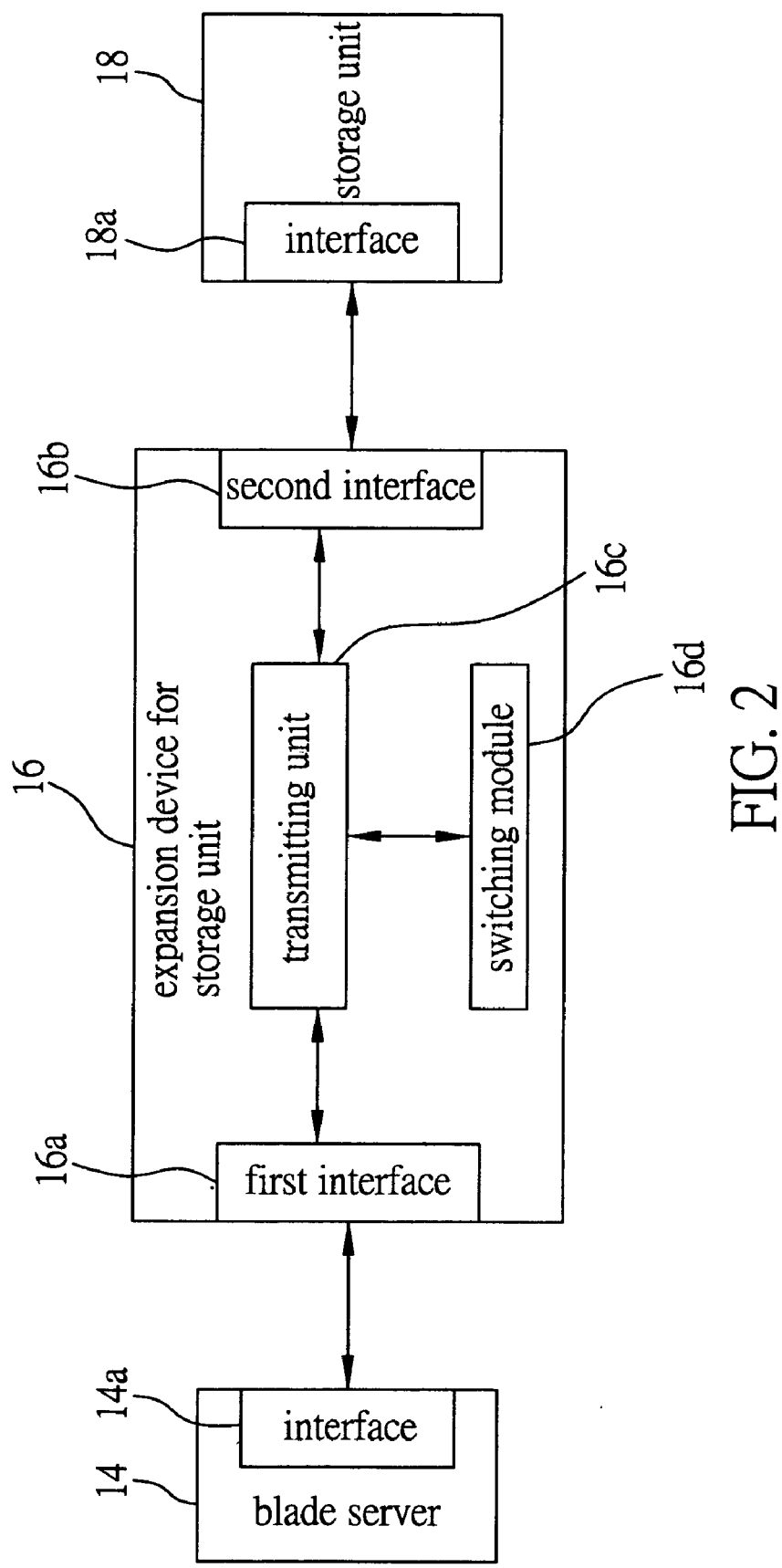
FIG. 2 is a block schematic diagram showing the basic architecture of the expansion device of FIG. 1 connected with at least one blade server and at least one storage unit.

FIG. 2 shows the basic structure of the expansion device 16 connected with at least one blade server 14 and at least one storage unit 18. As shown, the expansion device 16 comprises a first interface 16a connected with a data processing system such as the blade server 14 via the interface 14a; at least one second interface 16b connected with at least one storage unit 18, wherein the second interface 16b is provided with a transmitting standard compatible with that of the storage unit 18. In this embodiment, the second interface 16b can be an interface with Serial Advanced Technology Attachment (SATA) standard, Serial Attachment SCSI (SAS) standard (SCSI: Small Computer System Interface), or Fiber Channel (FC) standard.

The expansion device 16 may further comprise a transmitting unit 16c that provides data communication between the data processing system connected to the first interface and the storage unit connected to the second interface. In this embodiment, the transmitting unit 16c allows data transmission and receipt to be performed between the blade server 14 and the storage unit 18 through the first and second interfaces 16a, 16b.

The expansion device 16 may still further comprise a switching module 16d. The switching module 16d allows a circuit mechanism of the transmitting unit 16c to be switched to one compatible with a different transmitting standard for the storage unit according to user requirements. The transmitting unit 16c formed in the expansion device 16 is compatible with at least one transmitting standard for the storage unit 18. When the storage unit 18 using one transmitting standard is changed to another type of storage unit using a different transmitting standard, the user can select a circuit mechanism of the transmitting unit 16c compatible with the corresponding transmitting standard for the storage unit 18 through the use of the switching module 16d, and replace the second interface 16b by another one that uses the corresponding transmitting standard, such that the expansion device 16 can be switched to connection with storage units using different transmitting standards. In this embodiment, for example, the transmitting unit 16c is compatible with transmitting standards such as SATA, SAS and FC standards, wherein a single public circuit infrastructure is employed in compatible parts of the SATA, SAS and FC transmitting standards, and specific corresponding circuit infrastructures are employed in incompatible parts of the SATA, SAS and FC transmitting standards respectively. As a result, the user can switch the circuit infrastructure in the transmitting unit 16c to a specific one for the transmitting standard (such as SATA, SAS or FC) corresponding to the storage unit 18 via the switching module 16d. It should be noted that the second interface 16b is a modularized interface that is replaceable, and when the user switches the circuit mechanism of the switching module 16d, the second interface 16b is simultaneously replaced with an interface provided with a corresponding transmitting standard.

The storage unit 18 comprises a data transmitting interface 18a using a transmitting standard corresponding to that of the second interface 16b of the expansion device 16. The storage unit 18 communicates with the blade server 14 for data transmission and receipt via the interface 18a connected with the second interface 16b. In this embodiment, the storage unit 18 can be a hard disk provided with the aforementioned SATA, SAS or FC transmitting standard, and the expansion device 16 can support one or more SATA, SAS or FC hard disks according to user requirements.

In conclusion, the expansion device for storage units in accordance with the present invention allows the number of storage units connected with the expansion device to be adjusted or increased according to user requirements. Further, the expansion device can be connected with storage units using different transmitting standards via the transmitting unit and the switching module formed in the expansion device.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. An expansion device for storage units, for use with a blade server, the expansion device comprising:
   a first interface connected with a data transmitting interface disposed in the blade server, wherein the first interface is provided with a transmitting standard compatible with that of the data transmitting interface of the blade server,
   at least one second interface connected with a data transmitting interface disposed in at least one storage unit, wherein the second interface is provided with a transmitting standard compatible with that of the data transmitting interface of the storage unit;
   a transmitting unit for providing data communication between the blade server connected to the first interface and the storage unit connected to the second interface, the transmitting unit being preset with a circuit infrastructure corresponding to at least one transmitting standard of storage units, wherein if the transmitting unit corresponds to two or more transmitting standards, a single public circuit infrastructure is employed in compatible parts of the transmitting standards, and specific circuit infrastructures are employed in incompatible parts of the transmitting standards respectively; and a switching module for switching different circuit infrastructures in the transmitting unit corresponding to different transmitting standards, allowing a user to select a circuit infrastructure in the transmitting unit corresponding to a specific transmitting standard of storage units via the switching module, and replace the second interface with another second interface provided with the specific transmitting standard, so as to allow the expansion device to be connected with one or more of the storage units provided with the specific transmitting standard.

2. The expansion device as claimed in claim 1 wherein the second interface is a modularized interface that is replaceable.

3. The expansion device as claimed in claim 1, wherein the transmitting standard of the storage unit is one selectod from the group consisting of Serial Advanced Technology Attachment (SATA) standard, Serial Attachment SCSI (Small Computer System Interface) standard, and Fiber Channel (FC) standard.

* * * * *